US011132413B2

(12) United States Patent
Ramesan et al.

(10) Patent No.: US 11,132,413 B2
(45) Date of Patent: Sep. 28, 2021

(54) PROVIDING TRAVEL OR PROMOTION BASED RECOMMENDATION ASSOCIATED WITH SOCIAL GRAPH

(71) Applicant: MICROSOFT TECHNOLOGY LICENSING, LLC, Redmond, WA (US)

(72) Inventors: Roshin Lal Ramesan, Redmond, WA (US); Megan Quintero, Seattle, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 560 days.

(21) Appl. No.: 15/162,681

(22) Filed: May 24, 2016

(65) Prior Publication Data

US 2017/0344643 A1 Nov. 30, 2017

(51) Int. Cl.
*G06F 16/9535* (2019.01)
*G06Q 50/00* (2012.01)
(Continued)

(52) U.S. Cl.
CPC ......... *G06F 16/9535* (2019.01); *G06Q 30/02* (2013.01); *G06Q 30/0224* (2013.01);
(Continued)

(58) Field of Classification Search
CPC ........... G06F 17/30867; G06F 17/3053; G06F 17/30864; G06F 16/24578; G06F 16/951;
(Continued)

(56) References Cited

U.S. PATENT DOCUMENTS 8,504,423 B2 * 8/2013 Rotbard ............. G06Q 30/0229
705/14.49
8,606,508 B2 * 12/2013 Baker .................... G06Q 50/14
701/410
(Continued)

FOREIGN PATENT DOCUMENTS

CN 102903047 A 1/2013
CN 102982051 A 3/2013
(Continued)

OTHER PUBLICATIONS

Lazazzera, Richard, "How to Use Instagram to Promote Your Products", Published on: Sep. 15, 2014 Available at: http://www.socialmediaexaminer.com/use-instagram-to-promote-products/.
(Continued)

*Primary Examiner* — Mark E Hershley
(74) *Attorney, Agent, or Firm* — Michael Best & Friedrich LLP

(57) ABSTRACT

A travel or a promotion based recommendation is provided in association with a social graph of a recipient of a communication. A communication service initiates operations to provide the travel or promotion based recommendation by processing a content of a communication to identify a travel plan of a recipient or a promotion directed to a recipient. A detected shared attribute between the travel plan of the recipient and the travel plan of the acquaintance is assigned a relevancy score. The promotion is processed to determine a trend of the promotion with an acquaintance at a social networking site and an accuracy of the promotion. The shared attribute or the promotion is provided to the recipient.

19 Claims, 9 Drawing Sheets

(51) Int. Cl.
G06Q 30/02 (2012.01)
G06Q 30/06 (2012.01)
G06Q 50/12 (2012.01)
G06Q 50/14 (2012.01)

(52) U.S. Cl.
CPC ......... *G06Q 30/0631* (2013.01); *G06Q 50/01* (2013.01); *G06Q 50/12* (2013.01); *G06Q 50/14* (2013.01)

(58) Field of Classification Search
CPC ............... G06F 16/953; G06F 16/9532; G06F 16/9535; G06F 16/9536; G06F 16/9538
USPC ......................................................... 707/723
See application file for complete search history.

(56) References Cited

U.S. PATENT DOCUMENTS

| | | | | |
|---|---|---|---|---|
| 8,666,836 B2* | 3/2014 | Adams | | G06N 20/00 705/26.1 |
| 9,235,866 B2* | 1/2016 | Mishra | | G06Q 50/01 |
| 9,473,647 B2* | 10/2016 | Davis | | H04M 7/128 |
| 10,650,408 B1* | 5/2020 | Andersen | | G06Q 30/0275 |
| 2008/0215557 A1* | 9/2008 | Ramer | | G06F 16/68 |
| 2009/0006469 A1* | 1/2009 | Jain | | G06Q 30/02 |
| 2010/0306080 A1* | 12/2010 | Trandal | | G06Q 10/10 705/26.8 |
| 2010/0312724 A1* | 12/2010 | Pinckney | | G06N 5/048 706/11 |
| 2011/0153428 A1* | 6/2011 | Ramer | | G06Q 30/00 705/14.64 |
| 2011/0208822 A1* | 8/2011 | Rathod | | G06F 16/9535 709/206 |
| 2011/0320715 A1* | 12/2011 | Ickman | | G06Q 30/02 711/118 |
| 2012/0197709 A1* | 8/2012 | Kendall | | G06Q 30/0241 705/14.36 |
| 2012/0239466 A1* | 9/2012 | Hu | | G06Q 30/0269 705/14.1 |
| 2012/0284093 A1* | 11/2012 | Evans | | H04W 4/21 705/14.1 |
| 2012/0296920 A1* | 11/2012 | Sahni | | H04L 67/02 707/749 |
| 2013/0073387 A1* | 3/2013 | Heath | | G06Q 30/02 705/14.53 |
| 2013/0073400 A1* | 3/2013 | Heath | | G06F 16/29 705/14.73 |
| 2013/0073473 A1* | 3/2013 | Heath | | G06Q 30/06 705/319 |
| 2013/0103765 A1* | 4/2013 | Papakipos | | H04L 51/32 709/206 |
| 2013/0143520 A1* | 6/2013 | Cai | | G06Q 50/01 455/405 |
| 2013/0151342 A1* | 6/2013 | Citron | | A63F 13/537 705/14.64 |
| 2013/0166329 A1* | 6/2013 | Arnoux-Prost | | G06Q 10/02 705/5 |
| 2013/0166330 A1* | 6/2013 | Marziali | | G06Q 10/02 705/5 |
| 2013/0290172 A1* | 10/2013 | Mashinsky | | G06Q 20/384 705/39 |
| 2013/0297689 A1* | 11/2013 | Bhat | | H04L 51/32 709/204 |
| 2013/0304522 A1* | 11/2013 | Cundle | | G06Q 50/01 705/5 |
| 2014/0052577 A1* | 2/2014 | Gotlieb | | G06Q 30/0619 705/26.44 |
| 2014/0074629 A1* | 3/2014 | Rathod | | G06Q 30/0277 705/14.73 |
| 2014/0089020 A1* | 3/2014 | Murphy | | G06Q 10/02 705/5 |
| 2014/0095221 A1* | 4/2014 | Lore | | G06Q 30/06 705/5 |
| 2014/0095976 A1* | 4/2014 | Singh | | G06F 40/143 715/234 |
| 2014/0115057 A1* | 4/2014 | O'Sullivan | | G06Q 10/02 709/204 |
| 2014/0129942 A1* | 5/2014 | Rathod | | H04N 21/44222 715/720 |
| 2014/0149152 A1* | 5/2014 | Nickolson | | G06Q 40/02 705/5 |
| 2014/0189530 A1* | 7/2014 | Anand | | G06Q 30/06 715/753 |
| 2015/0088693 A1* | 3/2015 | Moore | | G06Q 30/0641 705/26.61 |
| 2015/0095154 A1* | 4/2015 | Kannan | | G06F 16/9535 705/14.55 |
| 2015/0134378 A1* | 5/2015 | Van Doren | | G06Q 50/14 705/6 |
| 2015/0193703 A1* | 7/2015 | Salomon | | G06Q 50/14 705/6 |
| 2015/0213370 A1* | 7/2015 | Chakrabarti | | G06N 7/005 706/52 |
| 2015/0248651 A1* | 9/2015 | Akutagawa | | G06Q 50/01 705/7.19 |
| 2016/0012514 A1* | 1/2016 | Brown | | G06Q 30/0635 705/26.81 |
| 2016/0117613 A1* | 4/2016 | Goldstein | | G06Q 30/0631 705/5 |
| 2016/0156584 A1* | 6/2016 | Hum | | G06F 3/0482 715/752 |
| 2016/0162172 A1* | 6/2016 | Rathod | | G06F 9/451 715/747 |
| 2016/0164982 A1* | 6/2016 | LeBeau | | G06Q 50/01 709/204 |
| 2016/0165002 A1* | 6/2016 | LeBeau | | H04W 4/21 709/204 |
| 2016/0203422 A1* | 7/2016 | Demarchi | | G06F 16/29 705/6 |
| 2016/0212230 A1* | 7/2016 | Schneider | | H04L 67/22 |
| 2016/0235374 A1* | 8/2016 | Miller | | G06F 1/163 |
| 2016/0246790 A1* | 8/2016 | Cowdrey | | G06F 16/24578 |
| 2016/0255139 A1* | 9/2016 | Rathod | | H04L 51/046 709/203 |
| 2016/0314519 A1* | 10/2016 | Liu | | G06Q 30/0641 |
| 2017/0109658 A1* | 4/2017 | El Azhar | | G06Q 10/02 |
| 2017/0149722 A1* | 5/2017 | Fernandez Acuna | ... | H04L 67/22 |
| 2017/0161651 A1* | 6/2017 | Demarchi | | G06F 16/9535 |
| 2017/0185920 A1* | 6/2017 | Chawla | | G06F 16/00 |

FOREIGN PATENT DOCUMENTS

| | | |
|---|---|---|
| CN | 103366267 A | 10/2013 |
| CN | 104573843 A | 4/2015 |
| WO | 2013023222 A1 | 2/2013 |
| WO | 2014172827 A1 | 10/2014 |

OTHER PUBLICATIONS

Kywe, et al., "On Recommending Hashtags in Twitter Networks", In Proceedings of 4th International Conference on Social Informatics, Dec. 2012, pp. 1-14.

Buck, Stephanie, "The Beginner's Guide to LinkedIn", Published on: May 23, 2012 Available at: http://mashable.com/2012/05/23/linkedin-beginners/#z9VmC66QKZqp.

"International Search Report and Written Opinion Issued in PCT Application No. PCT/US2017/033199", dated Jul. 12, 2017, 10 Pages.

"Office Action Issued in European Patent Application No. 17727052.7", dated Dec. 10, 2020, 6 Pages.

"First Office Action and Search Report Issued in Chinese Patent Application No. 201780032021.3", dated Jul. 5, 2021, 12 Pages.

* cited by examiner

PROVIDING TRAVEL OR PROMOTION BASED RECOMMENDATION ASSOCIATED WITH SOCIAL GRAPH

BACKGROUND

Information collection, management, and analysis have changed work processes associated communication management. Automation and improvements in work processes have expanded scope of capabilities offered by businesses. With the development of faster and smaller electronics execution of mass processes at consumption analysis systems have become feasible indeed, analysis work at data centers, data warehouses, data workstations have become common business features in modern work environments. Such systems execute a wide variety of applications ranging from enterprise resource management applications to complicated product tools. Many such applications process product and itinerary data to attempt to improve communications associated with product and travel. Email as a communication platform offers an intersect between past travel or product purchases predictions based on the past travel or product purchases.

Vast number of provider sources and product types complicate travel and/or product purchase. Indeed, fast changing dynamics of travel and/or product market may cause difficulties in making the correct choices in timely travel and/or product purchase at market values. Complications with multiple provider sources, product types, and complexity of the travel and/or product offers may lead to mismanagement of travel and/or product related communication and under utilization of offers to procure travel and/or product by an interested party.

SUMMARY

This summary is provided to introduce a selection of concepts in a simplified form that are further described below in the Detailed Description. This summary is not intended to exclusively identify key features or essential features of the claimed subject matter, nor is it intended as an aid in determining the scope of the claimed subject matter.

Embodiments are directed to providing a travel or a promotion based recommendation associated with a social graph. A communication service, according to embodiments, may initiate operations to provide a travel based recommendation by processing a content of a communication to identify a travel plan associated with a recipient. The travel plan may include a component associated with a previous purchase of a relation of the recipient from, a social graph, of the recipient. Another travel plan associated with an acquaintance of the recipient may also be identified. The acquaintance may be detected from the social graph of the recipient. Next, a shared attribute may be detected between the travel plan and the other travel plan. The shared attribute may be assigned a relevancy score. Furthermore, the shared attribute may be provided to the recipient based on the relevancy score.

The communication service may initiate operations to provide a promotion based recommendation by processing a content of a communication to identify a promotion directed to a recipient. Next, a social networking source may be queried to identify the promotion as presented to an acquaintance of the recipient. The acquaintance may be detected from a social graph of the recipient. The promotion may be ranked based on a number of interactions between the acquaintance and the promotion. A relevancy of the promotion for the recipient may be determined based on a rank of the promotion. Furthermore, a notification associated with the promotion may be provided to the recipient.

These and other and advantages will be apparent from a reading of the following detailed description and a review of the associated drawings. It is to be understood that both the foregoing general description and the following detailed description are explanatory and do not restrict aspects as claimed.

DETAILED DESCRIPTION

Figure 1A:
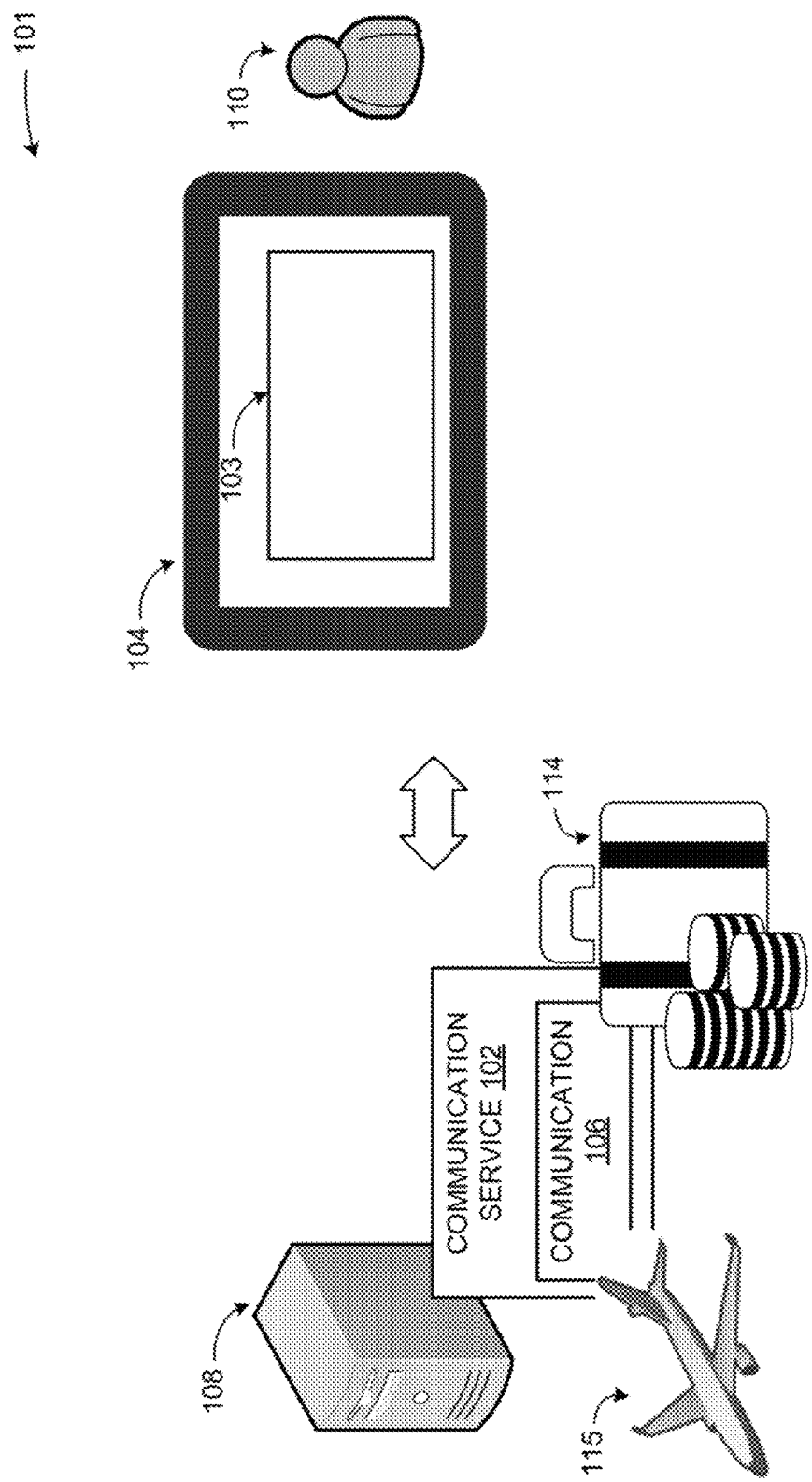
FIG. 1A through 1B are conceptual diagrams illustrating examples of providing a travel or a promotion based recommendation associated with a social graph, according to embodiments.

As briefly described above, a communication service may provide a travel or a promotion based recommendation associated with a social graph. In an example scenario, the communication service may process a content of a communication to identify a travel plan associated with a recipient. The travel plan may include a component associated with a previous purchase of a relation of the recipient from a social graph of the recipient. The travel plan may also include an order confirmation associated with a trip. Next, a travel plan of an acquaintance of the recipient may be identified. The acquaintance may be detected from the social graph of the recipient. A shared attribute may be detected between the travel plans of the recipient and the acquaintance. A relevancy score may be assigned to the shared attribute. The shared attribute may include a destination, a segment, and/or a time/frame that is in shared between the travel plans. The shared attribute may be provided to the recipient based on the relevancy score.

The communication service may also provide a promotion based commendation associated with a social graph. In an example scenario, the communication service may process a content of a communication to identify a promotion directed to a recipient. Next, a social networking source may be queried to identify the promotion as presented to an acquaintance of the recipient. The acquaintance may be detected from the social graph of the recipient. The promotion may include an offer associated with an item that may of an interest to the recipient.

The communication service may rank the promotion based on a number of interactions associated with the acquaintance and the promotion. The interactions may include a positive review and/or a positive comment of the promotion. A relevancy of the promotion for the recipient may, be determined based on a rank of the promotion. Furthermore, a notification associated with the promotion may be provided to the recipient.

In the following detailed description, references are made to the accompanying drawings that form a part hereof, and in which are shown by way of illustrations, specific embodiments, or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While some embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that perform particular tasks or implement particular abstract data types. Moreover, those skilled in the art will appreciate that embodiments may be practiced with other computer system configurations, including hand-held devices, multi-processor systems, microprocessor-based or programmable consumer electronics, minicomputers, mainframe computers, and comparable computing devices. Embodiments may also be practiced in distributed computing environments where tasks are performed by remote processing devices that are linked through a communications network. In a distributed computing environment, program modules may be located in both local and remote memory storage devices.

Some embodiments may be implemented as a computer-implemented process (method), a computing system, or as an article of manufacture, such as a computer program product or computer readable media. The computer program product may be a computer storage medium readable by a computer system and encoding a computer program that comprises instructions for causing a computer or computing system to perform example process(es). The computer-readable storage medium is a physical computer-readable memory device. The computer-readable storage medium can for example be implemented via one or more of a volatile computer memory, a non-volatile memory, a hard drive, a flash drive, a floppy disk, or a compact disk, and comparable hardware media.

Throughout this specification, the term "platform" may be a combination of software and hardware components to provide a travel or a promotion based recommendation associated with a social graph. Examples of platforms include, but are not limited to, a hosted service executed over a plurality of servers, an application executed on a single computing device, and comparable systems. The term "server" generally refers to a computing device executing one or more software programs typically in a networked environment. More detail on these technologies and example operations is provided below.

A computing device, as used herein, refers to a device comprising at least memory and a processor that includes a desktop computer, a laptop computer, a tablet computer, a smart phone, a vehicle mount computer, or a wearable computer. A memory may be a removable or non-removable component of a computing device configured to store one or more instructions to be executed by one or more processors. A processor may be a component of a computing device coupled to a memory and configured to execute programs conjunction with instructions stored by the memory. A file is any form of structured data that is associated with audio, video, or similar content. An operating system is a system configured to manage hardware and software components of a computing device that provides common services and applications. An integrated module is a component of an application or service that is integrated within the application or service such that the application or service is configured to execute the component. A computer-readable memory device is a physical computer-readable storage medium implemented via one or more of a volatile computer memory, a non-volatile memory, a hard drive, a flash drive, a floppy disk, or a compact disk, and comparable hardware media that includes instructions thereon to automatically save content to a location. A user experience—a visual display associated with an application or service through which a user interacts with the application or service. A user action refers to an interaction between a user and a user experience of an application or a user experience provided by a service that includes one of touch input, gesture input, voice command, eye tracking, gyroscopic input, pen input, mouse input, and keyboards input. An application programming interface (API) may be a set of routines, protocols, and tools for an application or service that enable the application or service to interact or communicate with one or more other applications and services managed by separate entities.

Figure 1B:
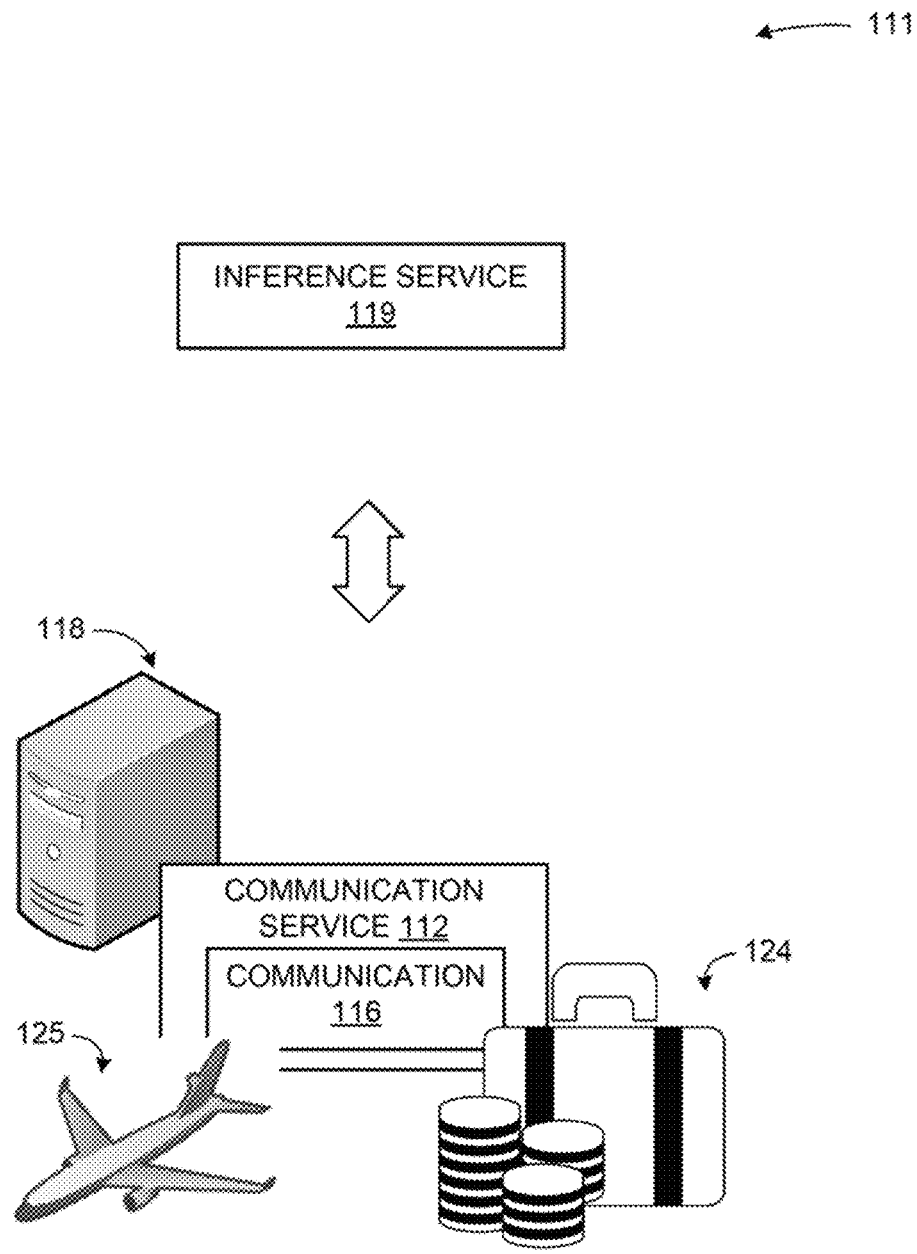

FIG. 1A through 1B are conceptual diagrams illustrating examples of providing a travel or a promotion based recommendation associated with a social graph, according to embodiments.

In a diagram 101, a server 108 may execute a communication service 102. The server 108 may include a physical server providing service(s) and/or application(s) to client devices. A service may include an application performing operations in relation to a client application and/or a subscriber, among others. The server 108 may include and/or is part of a workstation, a data warehouse, and/or a data center, among others.

The server 108 may execute the communication service 102. The communication service 102 may initiate operations to provide a travel or a promotion based recommendation associated with a social graph by processing a content of a communication to identify a travel plan associated with a recipient 110 or a promotion directed to the recipient 110. In the example configuration of FIG. 1A, if the communication 106 includes a travel plan 115, a travel plan of an acquaintance of the recipient 110 is identified. The travel plan may include a component associated with a previous purchase of a relation of the recipient from a social graph of the recipient. In addition, the acquaintance may be detected from the social graph of the recipient, as well. The travel plan of the acquaintance may be identified from a communication posted by the acquaintance on a social and/or a professional networking source. Next, a shared attribute may be detected between the travel plan 115 of the recipient 110 and the travel plan of the acquaintance. The shared attribute may be assigned a relevancy score. The shared attribute may include a shared destination, segment, and/or time frame among others. The shared attribute may be provided to, the recipient 110 based on the relevancy score through a client application 103 executed on client device 104. The recipient 110 may be alerted to the shared attribute to allow the recipient 110 to consider sharing of an activity with the acquaintance in relation to the shared attribute.

If the communication 106 includes a promotion 114, a social networking source is queried to identify the promotion 114 as presented to an acquaintance of the recipient 110. The acquaintance is detected from a social graph of the recipient. The social graph may include individual(s) with whom the recipient 110 may have a relationship. The social graph may be structured with a scheme that may rank the relationships such as a tree based data structure with a distance between each node reflecting an importance of a relationship. A short distance between nodes may reflect an important relationship while a long distance between nodes may reflect an unimportant relationship between the recipient 110 and the acquaintance.

Next, the communication service 102 may rank the promotion based on a number of interactions associated with the acquaintance and the promotion, interactions may include an access to a content of the promotion, among others. A relevancy of the promotion may be determined for the recipient based on a rank of the promotion. The promotion 114 may be ranked in proportion to a changing value of a trend associated with the promotion 114. The trend may be an overall number of accesses to the promotion by members of the social networking source. Furthermore, a notification associated with the promotion 114 may be provided to the recipient 110 through the client application 103 executed on the client device 104.

The server 108 may communicate with the client device 104 through a network. The network may provide wired or wireless communications between nodes such as the client device 104, or the server 108, among others. Previous example(s) to provide a travel or a promotion based recommendation associated with a social graph are not provided in a limiting sense. Alternatively, the communication service 102 may manage the communication 106 at a desktop application, a workstation application, and/or a server application, among others. The client application may also, include a client interface of the communication service 102.

The recipient 110 may interact with the client application 103 with a keyboard based input, a mouse based input, a voice based input, a pen based input, and a gesture based input, among others. The gesture based input may include one or more touch based actions such as a touch action, a swipe action, and a combination of each, among others.

In a diagram 111 of FIG. 1B, the communication service 112 (executing in a server 118) may interact with an inference service 119 to process the communication 116 to identify a travel plan 125 or a promotion 124 within a content of the communication 116. The inference service 119 may include, a third party service provider. Furthermore, the inference service 119 may execute operations to provide a shared attribute associated with the travel plan 125 and a travel plan of an acquaintance. Alternatively, the promotion 124 associated with an item of interest may be provided to a recipient of the communication 116.

The communication service 112 may remove private information from any interaction with the inference service 119 to anonymize data transmitted to the inference service 119. The inference service 119 may interact with a social networking provider and retrieve information associated with a travel plan or a promotion presented to the acquaintance. A detected shared attribute between the travel plans may be transmitted to the recipient based on a relevancy score to prompt the recipient to consider a shared activity associated with the shared attribute. Alternatively, the promotion may be transmitted to the recipient to allow the recipient to acquire an item associated with the promotion.

While the example systems in FIG. IA through 1B have been described with specific components including the server 108, the communication service 102, embodiments are not limited to these components or system configurations and can be implemented with other system configuration employing fewer or additional components.

Figure 2:
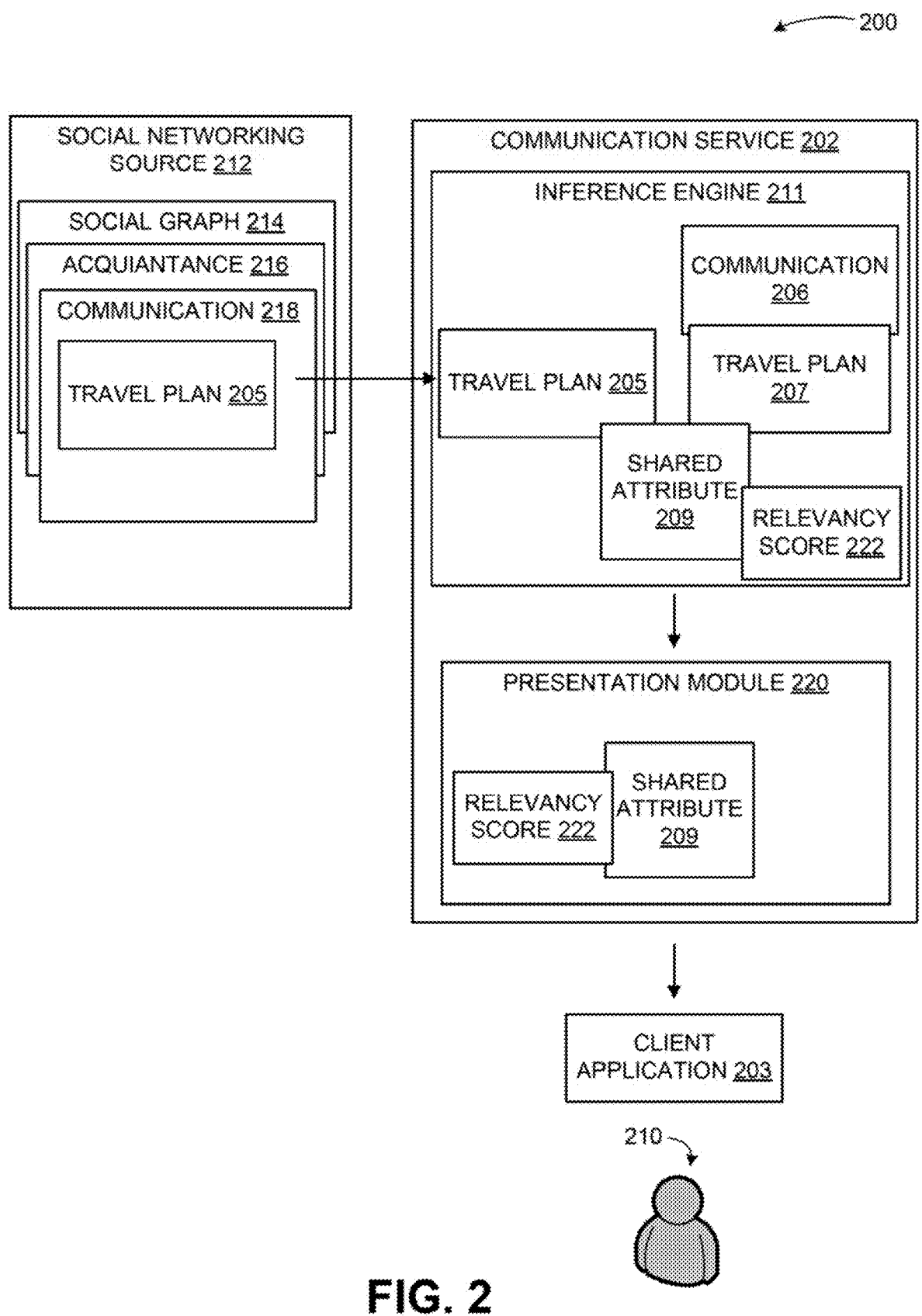
FIG. 2 is a display diagram illustrating example components of a communication service that provides a travel based recommendation associated with a social graph, according to embodiments.

FIG. 2 is a display diagram illustrating example components of a communication service that provides a travel or a promotion based recommendation associated with a social graph, according to embodiments.

In a diagram 200, an inference engine 211 of a communication service 202 may process a content of a communication 206 to identify a travel plan 207 associated with a recipient 210. The communication 206 may include an email, and/or a text based message, a social networking post, among others. The travel plan 207 may include an order confirmation associated with a travel purchase made by the recipient 210. The travel plan may also include a component associated with a previous purchase of a relation of the recipient from a social graph of the recipient. The relation may include a family, a friend, and/or a co-worker, among others within the social graph of the recipient. The previous purchase may include a purchase associated with a travel plan of the relation. The previous purchase may be retrieved from a social networking source 212. The component may include a portion of the travel plan (of the relation) such as airfare cost, lodging cost, among others that may influence the recipient. The recipient may choose to purchase a similar component as the previous purchase of the relation for the travel plan of the recipient.

Next, the inference engine 211 may query the social networking source 212 to identify a travel plan 205 of an acquaintance 216. The acquaintance 2.1.6 may be detected from a social graph 214 of the recipient 210. The social graph 214 may include members of the social networking source that have a relationship with the recipient 210. The travel plan 205 may be detected in a communication 218 that may be posted by the acquaintance 216 on the social networking source. The communication 218 may include a social networking post, an email, a text message, and/or a social networking update, among others.

A shared attribute may be detected between the travel plans (205 and 207). The shared attribute may include a shared destination, segment, and/or time frame, among others of trip(s). The shared attribute may also be assigned a relevancy score. The relevancy score may be assigned based on behavioral history of the recipient. For example, a shared attribute such as airfare in a business section of a flight may receive an increased relevancy score if the recipient 210 (and the acquaintance) are identified to have a preference for business section. Alternatively, the relevancy score may decrease for the shared attribute (such as the airfare in the business section of the flight) if the shared, attribute may be identified as unimportant to the recipient 210 (and/or the acquaintance).

Next, a presentation module of the communication service may provide the shared attribute to the recipient 210 based on the relevancy score 222 by transmitting the shared attribute to a client application 203 to be displayed to the recipient. In an example scenario, if the relevancy score 222 for the shared attribute 209 is identified to exceed a threshold (configurable dynamically or by the recipient, or a stakeholder such as an administrator), then the shared attribute may be transmitted to the client application 203. If the relevancy score for the shared attribute 209 is identified to fall below the threshold then the shared attribute 209 may be discarded. The shared attribute may be provided to the recipient 210 to prompt the recipient 210 to consider a shared activity associated with the shared attribute 209.

The social graph 214 may be retrieved from the social network source 212 (alternatively from a professional networking source) associated with the recipient 210. The social graph may be ranked based on a number of interactions between the recipient 210 and social contact(s) within the social graph. The social contact with a high number of interactions is ranked at a top of the social graph 214. The social contact with a low umber of interactions is ranked at a bottom of the social graph. The interactions between the social contact(s) and the recipient 210 may include communication(s).

Next, the inference engine may select the acquaintance from a top position of the social graph 214 (that is ranked). The social networking source (or another communication source) may be queried for a communication (by the acquaintance) related to a travel plan of the acquaintance. The content of a returned communication may be processed to identify the travel plan 205 of the acquaintance.

In an example scenario, the inference engine 211 may analyze the shared attribute 209 to identify a shared activity between the recipient and the acquaintance. For example, the inference engine 211 may detect a plane ride and a hotel as the shared, attribute 209. The inference engine may suggest a shared taxi ride as a shared activity following the plane ride to reach the hotel for the recipient 210 and the acquaintance 216 to share.

In another example scenario, the inference engine 211 may identify a price paid by the recipient 210 and another price paid by the acquaintance 216 for the shared attribute 209. The price paid by the recipient 210 and the price paid by the acquaintance 216 may be detected as different. As such, the inference engine 211 may instruct the presentation module 220 to provide the price paid by the recipient, the price paid by the acquaintance, and the difference between the prices to the recipient 210 to inform the recipient 210. For example, the recipient 210 may have paid a higher price for an airfare, as the shared attribute, compared the price paid by the acquaintance 216 for the airfare. As such, the recipient 210 may be informed to seek reimbursement for the difference and/or to use an alternative source to purchase the shared attribute 209 or the travel plan 207 (in the future).

The inference engine 211 may also identify a payment information associated with a price paid by the recipient 210 for the travel plan 207 and/or the shared attribute 209. The payment information may include a booking source, a booking time, a booking discount, and/or a payment type, among others. The inference engine 211 may also identify a payment information associated with a price paid by the acquaintance 216 for the travel plan 205 and/or the shared attribute 209. The payment information may also include a booking source, a booking time, a booking discount, and/or a payment type, among others. The inference engine 211 may instruct the presentation module 220 to provide the payment information for the price paid by the recipient 210 and the payment information for the price paid by the acquaintance 216 to the client application 203 to inform the recipient 210 of any difference between the payment information.

In a further example scenario, a booking source of the travel plan 205 may be identified. The booking source may be compared to the booking source of the travel plan 207. The booking source for the travel plan 205 may be determined to be different from the booking source of the travel plan 207. As such, the booking source for the travel plan 205 may be provided to the recipient 210 to inform the recipient 210 of alternative booking source that may be more advantages because the alternative booking sources offers discounted price and/or a time frame flexibility, among others for the travel plan 207.

The booking source for the travel plan 205 may also be queried for information associated with the travel plan 207 of the recipient 210. The information may include a price and/or a related activity such as a leisure trip while at a site of the travel plan 207. The information associated with the travel plan 207 may be received in response to the query. Next, the information associated with the travel plan 207 may be provided to the recipient 210 to inform the recipient of the alternative information related to the travel plan 207 retrieved from the alternative booking source.

In another example scenario, the inference engine may receive information associated with the travel plan 205 from the social networking source 212. The information may indicate a cancellation of the travel plan 205 by the acquaintance. The inference engine 211 may detect the cancellation and prompt the presentation module 220 to provide the cancellation of the travel plan 205 of the acquaintance to the recipient 210.

Figure 3:
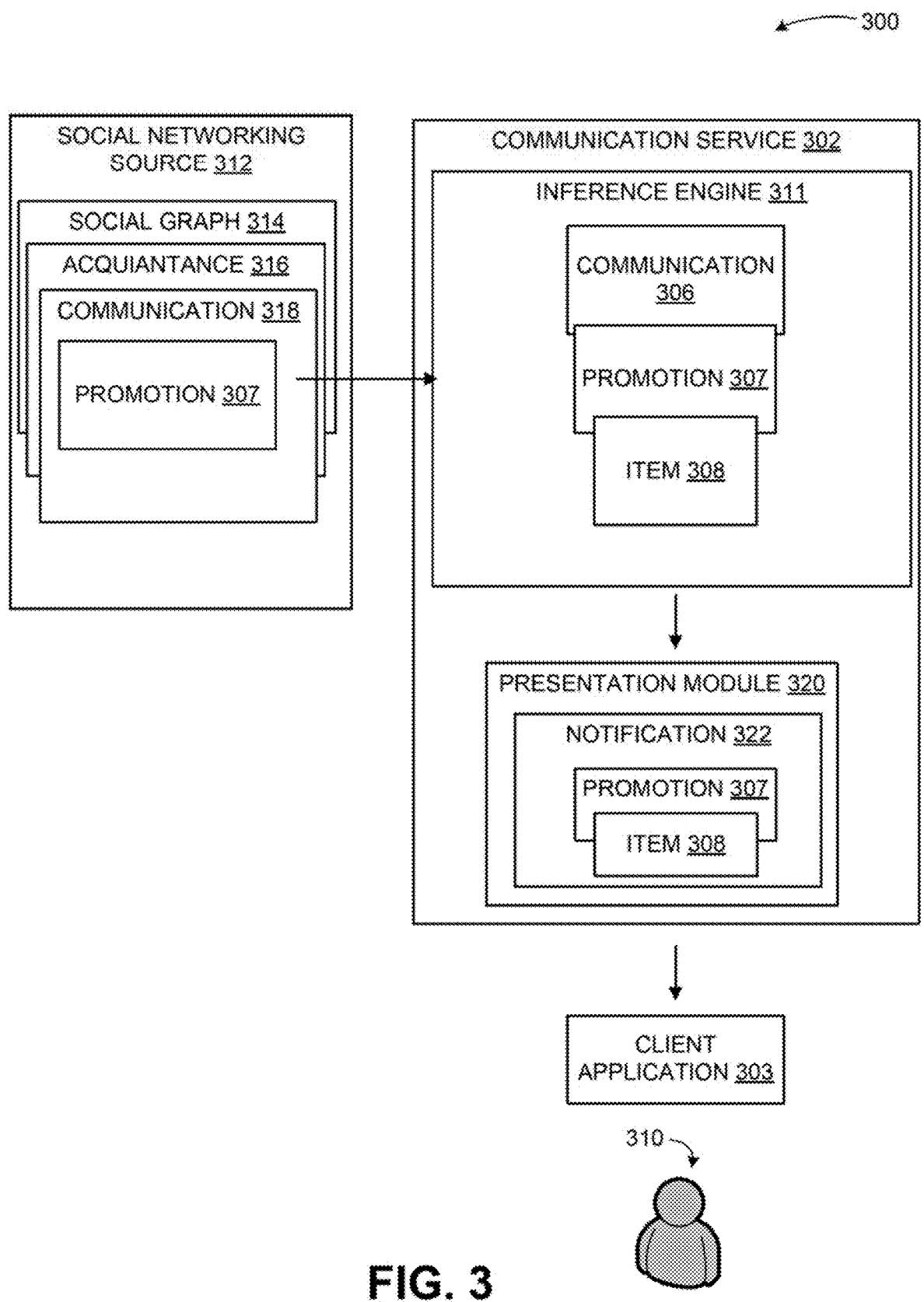
FIG. 3 is a display diagram illustrating components of a scheme to provide a promotion based recommendation associated with a social graph, according to embodiments.

FIG. 3 is a display diagram illustrating components of, a scheme to provide a promotion based re commendation associated with a social graph, according to embodiments.

In a diagram 300, an inference engine 311 of a communication service 302 may process a content of a communication 306 to identify a promotion 307 directed to a recipient 310. Next, the inference engine 311 may query a social networking source 312 to identify the promotion 307 in a communication 318 as presented to an acquaintance 316 of the recipient 310. The acquaintance 316 may be detected from a social graph 314 of the recipient 310.

The promotion 307 may be ranked based on a number of interactions between the acquaintance 316 and the promotion 307. The number of interactions may include the acquaintance 316 accessing the promotion in a number of time(s). The promotion 307 may also be ranked based on a number of interactions between members of the social networking source 312 (associated with the recipient) and the promotion 307. The number of members of the social networking source 312 (associated with the recipient) may be inserted into the promotion 307 as metadata. Next, a relevancy of the promotion 307 may be detected for the recipient 310. The relevancy may be determined based on a rank of the promotion compared to other promotion(s) offered to the acquaintance or members of the social networking source 312. Upon detecting the relevancy of the promotion 307, the presentation module 320 may be instructed to transmit a notification 322 that includes the promotion 307 to a client application 303 to inform the recipient of the promotion 307. The promotion 307 may include a discount, a sale, and/or a payment plan to help the recipient 310 acquire an item 308 described in the promotion 307.

In an example scenario, the rank of the promotion may be detected to exceed a threshold number of interactions between the acquaintance 316 (and/or the members of the social networking source 312) and the promotion 307. A high number of interactions may correlate to a valued promotion. As such, the promotion may be classified as a relevant communication for the recipient 310.

In another example scenario, the content and/or a metadata of the communication 306 may be analyzed to identify the item 308 associated with the promotion 307. An interest of the recipient 310 associated with the item 308 may be detected based on a purchase history (of the recipient 310) associated with the item 308. The purchase history associated with the item 308 may be identified by analyzing a past communication of the recipient 310 that includes an order confirmation and/or a shipping confirmation associated with the item 308. The purchase history may reflect a frequency of a purchase of the item 308 which may signify the relevancy of the item to the recipient 310 (a high relevancy for frequent purchases, a low relevancy for rare purchases).

The social networking source 312 may also be queried to identify a changing value of a trend associated with the promotion 307. The changing value of the trend may be identified based on interactions between the acquaintance 316 and the promotion 307 and between member(s) of the social networking source 312 and the promotion 307. An increase in the rank of the promotion 307 may be in proportion to an increase in value of the trend. Alternatively, a decrease in the rank of the promotion 307 may be in, proportion to a decrease in value of the trend.

Figure 4:
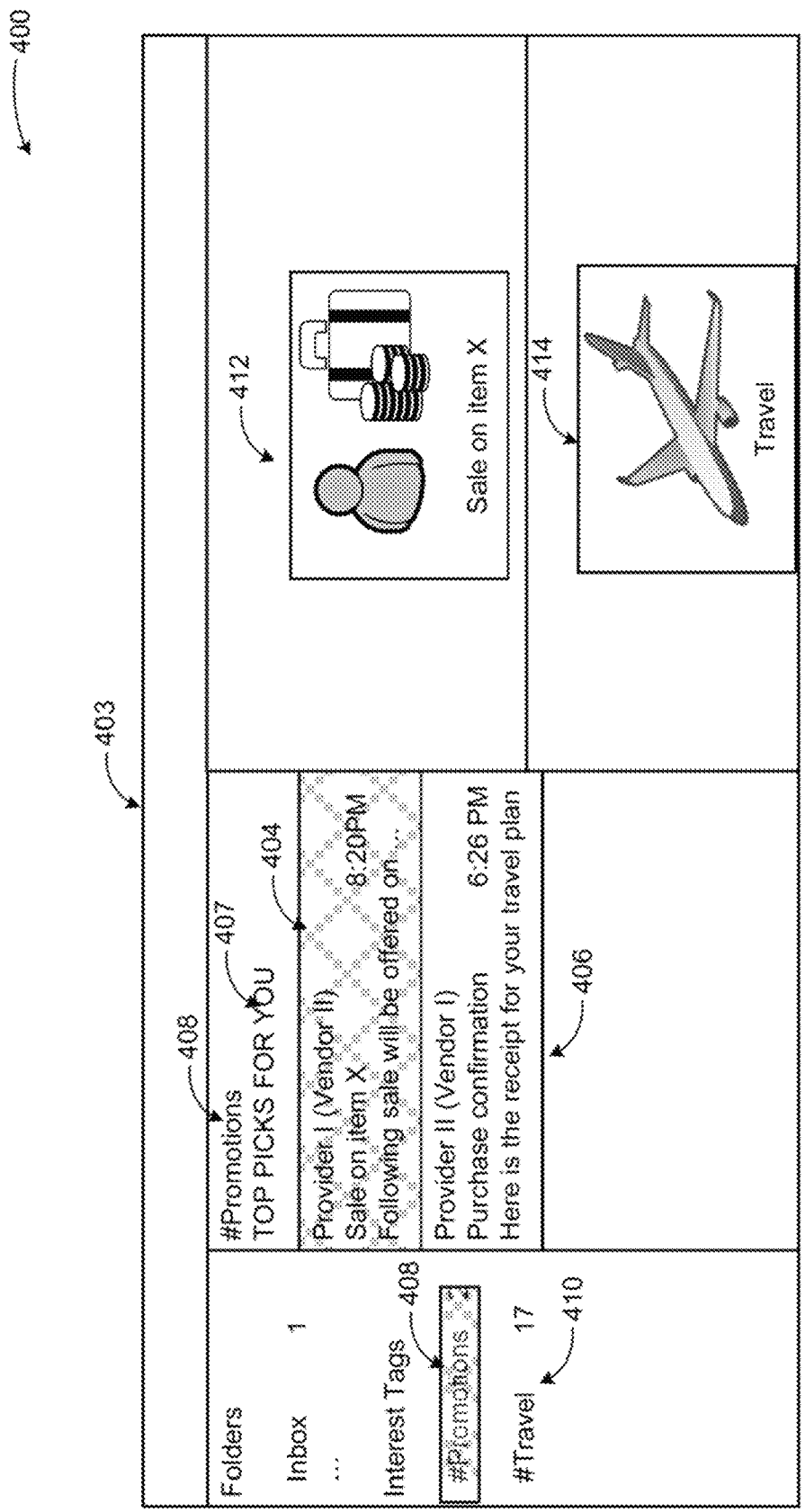
FIG. 4 is display diagram illustrating an example of an interface that provides a recommendation based on a travel or a promotion associated with a social graph, according to embodiments.

FIG. 4 is a display diagram illustrating an example of an interface that provides travel or a promotion based recommendation associated with a social graph, according to embodiments.

In a diagram 400, a communication service 402 may provide interface to be rendered by the client application 403 or provide data to be displayed by the interface of the client application 403 such as a communication application. The communication service may categorize communications (404 and 406) based on a tag category 408 such as a promotion related, tag. In response to an interaction by a recipient that selects a communication 404 within a tag category 408, the communication service may identify a promotion 412 within the communication 404 and prompt the client application 403 to display the promotion 412. Alternatively, a travel plan 414 identified within another communication 406 may be displayed in response to a selection of a tag category 410 or a selection of the other communication 406.

The communication service may also identify the communications (404 and 406) that include the promotion 412 and the travel, plan 414 with a label 407. The label 407 may emphasize a relevance of the communications (404 and 406) to the recipient. As such, the label may be changed to reflect the relevance such as an importance to the recipient, a time limited availability (of the promotion 412 or the travel plan 414), and/or a cost associated with the promotion 412 and/or the travel 414 (which may be within a budget defined by the recipient), among others.

As discussed above, the communication service may be employed to perform operations to automate providing a travel or a promotion based recommendation associated with a social graph. An increased user efficiency with the client application may occur as a result of processing a communication through the communication service 102 to identify a travel plan or a promotion. Additionally, processing the communication, and an acquaintance, and the recipient, by the communication service 102, may reduce processor load, increase processing speed, conserve memory, and reduce network bandwidth usage.

Embodiments, as described herein, address a need that arises from a lack of efficiency to provide a travel or a promotion based recommendation associated with a social graph. The actions/operations described herein are not a mere use of a computer, but address results that area direct consequence of software used as a service offered to large numbers of users and applications.

The example scenarios and schemas in FIG. 1A through 4 are shown with specific components, data types, and configurations. Embodiments are not limited to systems according to these example configurations. Providing a travel or a promotion based recommendation associated with a social graph may be implemented in configurations employing fewer or additional components in applications and user interfaces. Furthermore, the example schema and components shown FIG. 1A through 4 and their sub components may be implemented in a similar manner with other values using the principles described herein.

Figure 5:
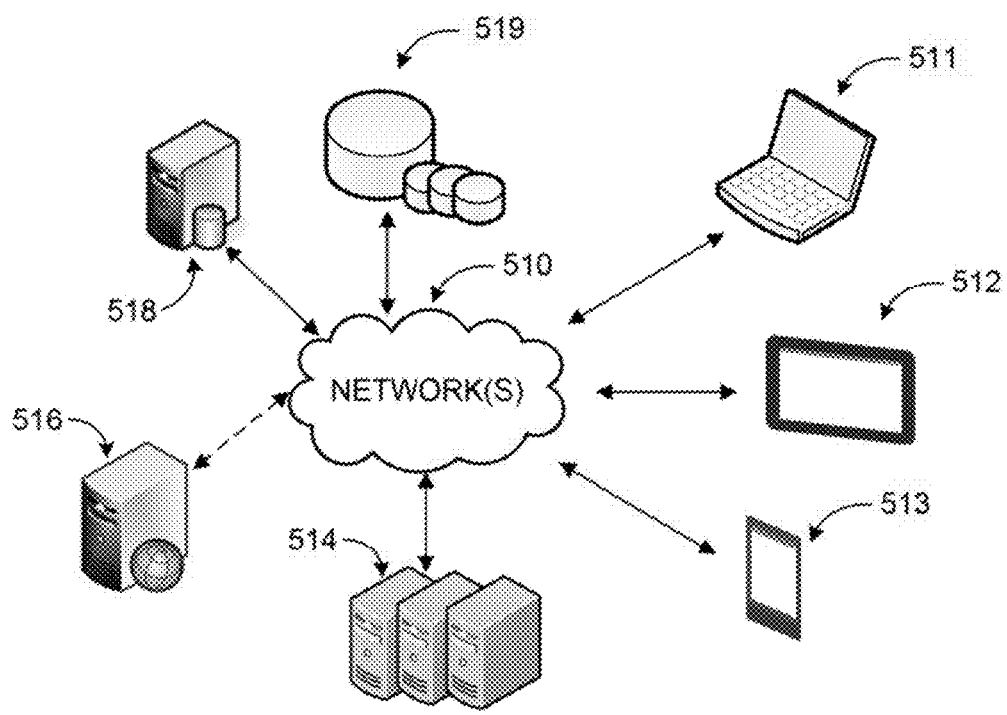
FIG. 5 is a simplified networked environment, where a system according to embodiments may be implemented.

FIG. 5 is an example networked environment, where embodiments may be implemented. A communication service configured to provide a promotion based recommendation associated with a social graph may be implemented via software executed over one or more servers 514 such as a hosted service. The platform may communicate with client applications on individual computing devices such as a smart phone 513, a mobile computer 512, or desktop computer 511 ('client devices') through network(s) 510.

Client applications executed on any of the client devices 511-513 may facilitate communications via application(s) executed by servers 514, or on individual server 516. A communication service may process a content of a communication to identify a travel plan of a recipient or a promotion directed to a recipient. A shared attribute may be detected between the travel plans of the recipient and the acquaintance. The shared attribute may be assigned a relevancy score The promotion may be processed to determine a trend of the promotion with an acquaintance at a social networking site. Next, the shared attribute or the promotion may be provided to the recipient based on the relevancy score. The communication application may store data associated with the item in data store(s) 519 directly or through database server 518.

Network(s) 510 may comprise any topology of servers, clients, Internet service providers, and communication media. A system according to embodiments may have a static or dynamic topology. Network(s) 510 may include secure networks such as an enterprise network, an unsecure network such as a wireless open network, or the Internet. Network(s) 510 may also coordinate communication over other networks such as Public Switched Telephone Network (PSTN) or cellular networks. Furthermore, networks) 510 may include short range wireless networks such as Bluetooth or similar ones. Network(s) 510 provide communication between the nodes described herein. By way of example, and not limitation, network(s) 510 may include wireless media such as acoustic, RF, infrared and other wireless media.

Figure 6:
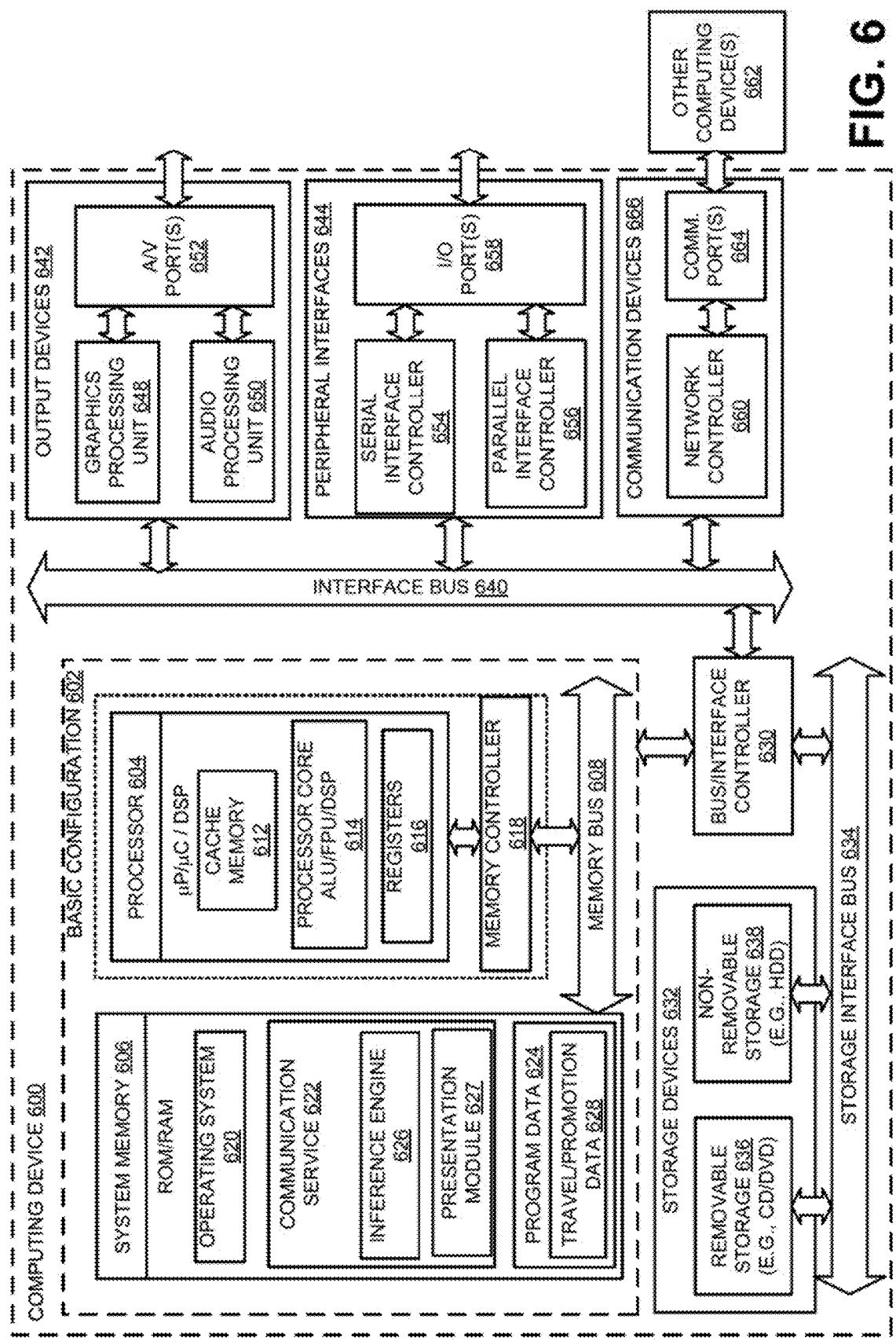
FIG. 6 is a block diagram of an example computing device, which may be used to provide a travel or a promotion based recommendation associated with a social graph, according to embodiments.

Many other configurations of computing devices, applications, data sources, and data distribution systems may be employed to provide a travel or a promotion based recommendation associated with a social graph. Furthermore, the networked environments discussed in FIG. 5 are for illustration purposes only. Embodiments are not limited to the example applications, modules, or processes, FIG. 6 is a block diagram of an example computing device, which, may be used to provide a travel or a promotion based recommendation associated with a social graph, according to embodiments.

For example, computing device 600 may be used as a server, desktop computer, portable computer, smart phone, special purpose computer, or similar device. In an example basic configuration 602, the computing device 600 may include one or more processors 604 and a system memory 606. A memory bus 608 may be, used for communication between the processor 604 and the system, memory 606. The basic configuration 602 may be illustrated in FIG. 6 by those components within the inner dashed line.

Depending on the desired configuration, the processor 604 may be of any type, including but not limited to a microprocessor (µP), a microcontroller (µC), a digital signal processor (DSP), or any combination thereof. The processor 604 may include one more levels of caching, such as a level cache memory 612, one or more processor cores 614, and registers 616. The example processor cores 614 may (each) include an arithmetic logic unit (ALU), a floating point unit (FPU), a digital signal processing core (DSP Core), or any combination thereof. An example memory controller 618 may also be used with the processor 604, or in some implementations, the memory controller 618 may be an internal of the processor 604.

Depending on the desired configuration, the system memory 606 may be of any type including but not limited to volatile memory (such as RAM), non-volatile memory (such as ROM, flash memory, etc.), or any combination thereof. The system memory 606 may include an operating system 620, a communication service 622, and a program data 624. The communication service 622 may include components such as an inference engine 626 and a presentation module 627. The inference engine 626 and the presentation module 627 may execute the processes associated with the communication service 622. The inference engine 626 may process a content of a communication to identify a travel plan of a recipient or a promotion directed to a recipient. A shared attribute may be detected between the travel plans of the recipient and the acquaintance. The shared attribute may be assigned a relevancy score. The promotion may be processed to determine a trend of the promotion with an acquaintance at a social networking site. The promotion may also be assigned a relevancy score. Next, the presentation module 627 may provide the shared attribute or the promotion to the recipient based on the relevancy score.

Input to and output out of the communication application 622 may be transmitted through a communication device associated with the computing device 600. An example of the communication device may include a networking device that may be communicatively coupled to the computing device 600. The networking device ray provide wired and/or wireless communication. The program data 624 may also include, among other data, travel/promotion data 628, or the like, as described herein. The travel/promotion data 628 may include a shared attribute or and an item of interest, among others.

The computing device 600 may have additional features or functionality, and additional interfaces to facilitate communications between the basic configuration 602 and any desired device and interfaces. For example, a bus/interface controller 630 may be used to facilitate cot communications between the basic configuration 602 and one or more data storage devices 632 via a storage interface bus 634. The data storage devices 632 tray be one or more removable storage devices 636, one or more non-removable storage devices 638, or a combination thereof. Examples of the removable storage and the non-removable devices may include magnetic disk devices, su has flexible disk drives and hard-disk drives (HDDs), optical disk drives such as compact disk (CD) drives or digital versatile disk (DVD) drives, solid state drives (SSDs), and tape drives, to name a few. Example computer storage media ay include volatile and nonvolatile, removable, and non-removable media implemented in any method or technology for storage of information, such as computer-readable instructions, data structures, program modules, or other data.

The system memory 606, the removable storage devices 636 an the non removable storage devices 638 are examples of computer storage media. Computer storage media includes, but is not limited to, RAM, ROM, EEPROM, flash memory or other memory technology, CD-ROM, digital versatile disks (DVDs), solid state drives, or other optical storage, magnetic cassettes, magnetic tape, magnetic disk storage or other magnetic storage devices, or any other d n which may be used to store the desired information and which may be accessed by the computing device 600. Any such computer storage media ma be part of the computing device 600.

The computing device 600 may also include an interface bus 640 for facilitating communication from various interface device (for example, one or more output devices 642, one or more peripheral interfaces 644, and one or more communication devices 666) to the basic configuration 602 via the bus/interface controller 630. Some of the example output devices 642 include a graphics processing unit 648 and an audio processing unit 650, which may be configured to communicate W various external devices such as a display or speakers via one or more A/V ports 652. One or more example peripheral interfaces 644 may include a serial interface controller 654 or a parallel interface controller 656, which may be configured to communicate with external devices such as input devices (for example, keyboard, mouse, pen, voice input device, touch input device, etc.) or other peripheral devices (for example, printer, scanner, etc.) via one or more I/O ports 658. An example of the communication device(s) 666 includes a network controller 660, which may be arranged to facilitate communications with one or more other computing devices 662 over a network communication link via one or more communication ports 664. The one or more other computing devices 662 may include servers, computing devices, and comparable devices.

The network communication link may be one example of a communication media, Communication media may typically be embodied by computer readable instructions, data structures, program modules, or other data in a modulated data signal, such as a carrier wave or other transport mechanism, and may include any information delivery media. A "modulated data signal" may be a signal that has one or more of its characteristics set or changed in such a manner as to encode information in the signal. By way of example, and not limitation, communication media may include wired media such as a wired network or direct-wired connection, and wireless media such as acoustic, radio frequency (RF), microwave, infrared (IR) and other wireless media. The term computer readable media as used herein may include both storage media and communication media.

The computing device 600 may be implemented as apart of a general purpose or specialized server, mainframe, or similar computer, which includes any of the above functions. The computing device 600 may also be implemented as a personal computer including both laptop computer and non-laptop computer configurations.

Example embodiments may also include methods to provide a travel or a promotion based recommendation associated with a social graph. These methods can be implemented in any number of ways, including the structures described herein. One such way may be y machine operations, of devices of the type described in the present disclosure.

Another optional way may be for one or more of the individual operations of the methods to be performed in conjunction with one or more human operators performing some of the operations while other operations may be performed by machines. These human operators need not be collocated with each other, but each can be only with a machine that performs a portion of the program. In other embodiments, the human interaction can be automated such as by pre-selected criteria that may be machine auto ted.

Figure 7:
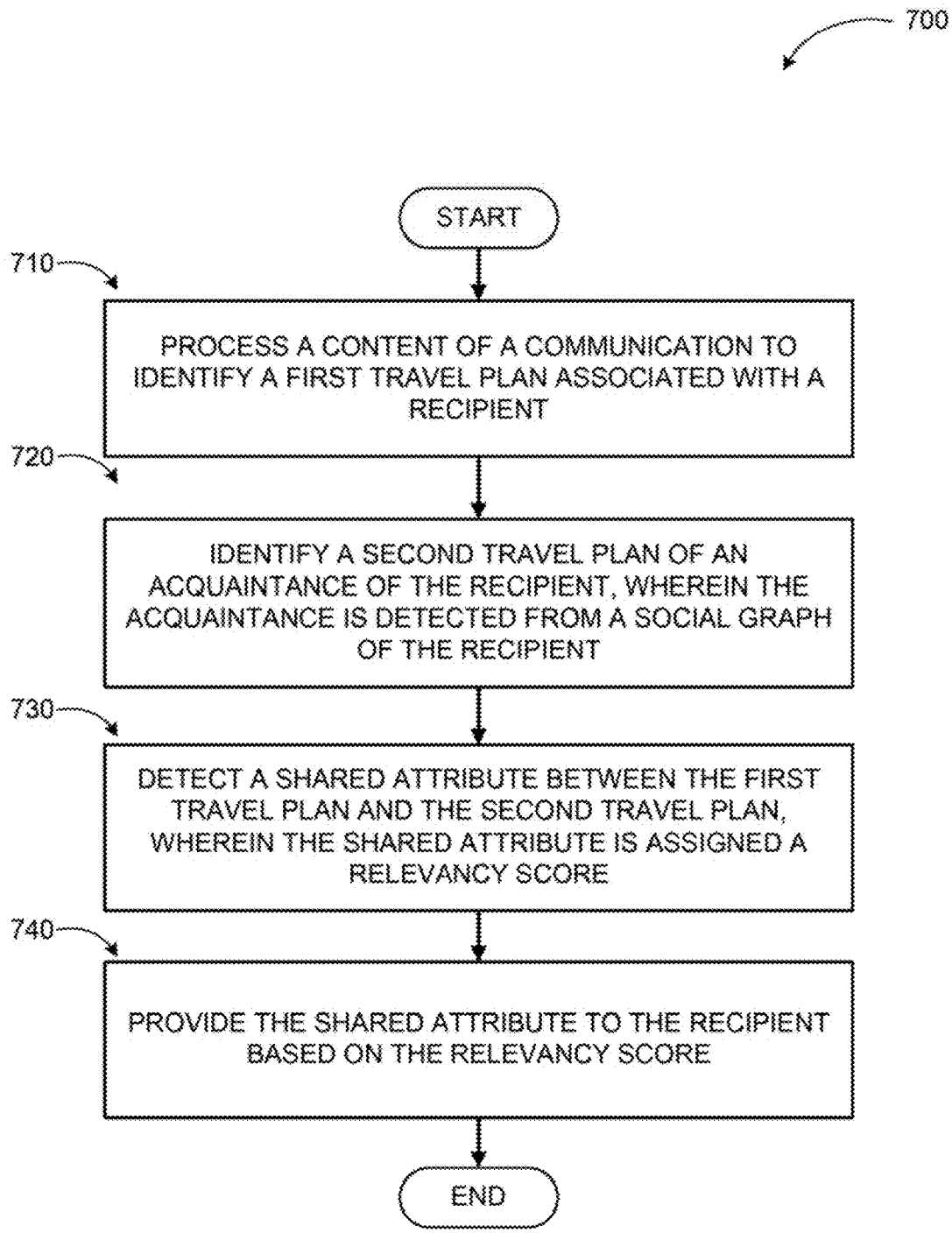
FIG. 7 is a logic flow diagram illustrating a process for providing a travel based recommendation associated with a social graph, according to embodiments.

FIG. 7 is a logic flow, diagram illustrating a process for providing a travel based re commendation associated with a social graph, according to embodiments. Process 700 may be implemented on a computing device, such as the computing device 600 or another system.

Process 700 begins with operation 710, where the communication service processes a content of a communication to identify a travel plan associated with a recipient. At operation 720, a travel plan of an acquaintance of the recipient may be identified. The acquaintance may be detected from a social graph of the recipient. At operation 730, a shared attribute between the travel plan of the recipient and the travel plan of the acquaintance may be detected. The shared attribute may be assigned a relevancy score. At operation 740, the shared attribute may be provided to the recipient based on the relevancy score.

Figure 8:
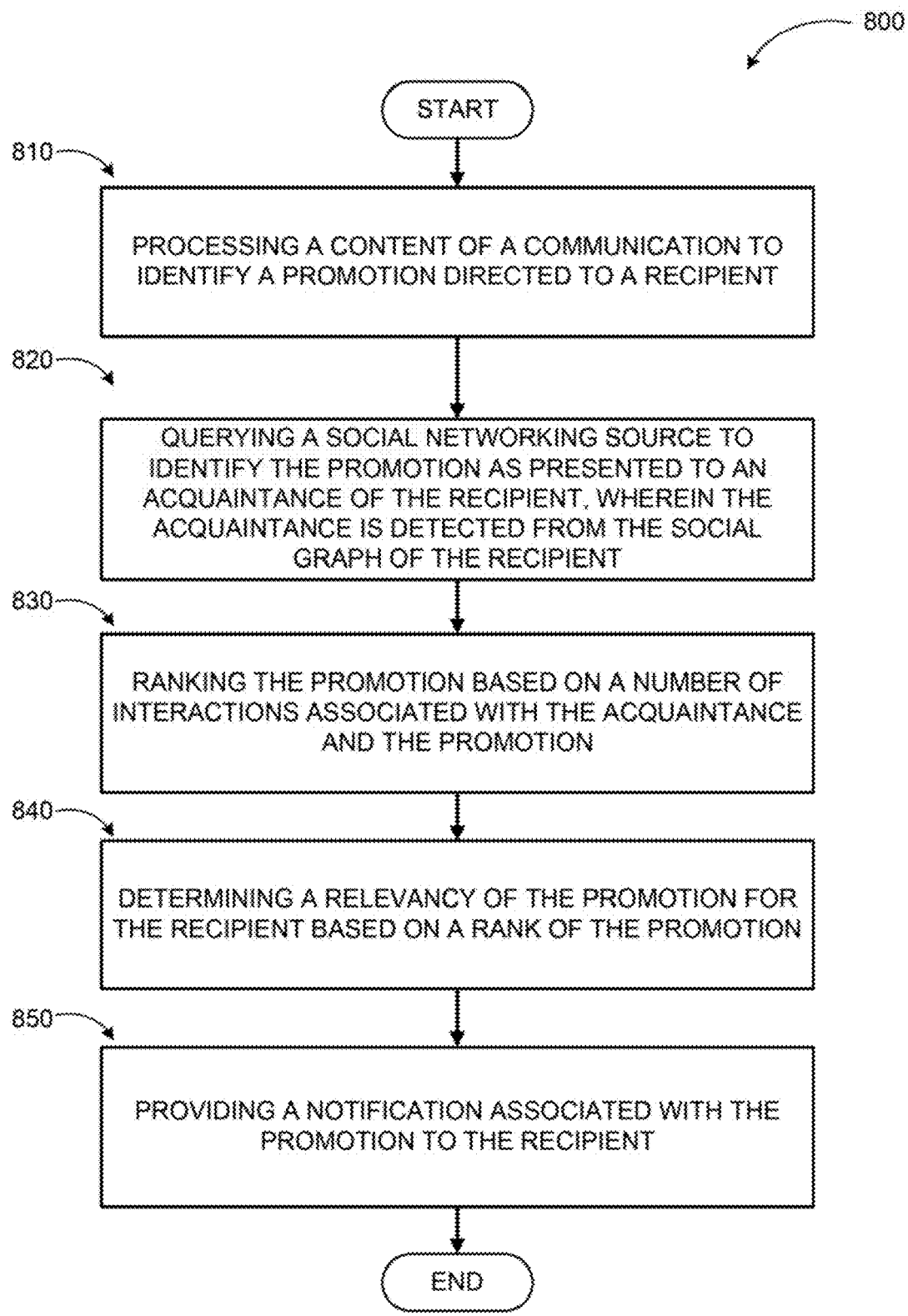
FIG. 8 is a logic flow diagram illustrating a process for providing a promotion based recommendation associated with a social graph, according to embodiments.

FIG. 8 is a logic flow diagram illustrating a process for providing a promotion based recommendation associated with a social graph, according to embodiments. Process 800 may be implemented on a computing device, such as the computing device 600 or another system.

Process 800 begins with operation 810, where the communication service processes a content of a communication to identify a promotion directed to a recipient social networking source may be queried to identify the promotion as presented to an acquaintance of the recipient at operation 820. The acquaintance may be detected from a social graph of the recipient. Next, at operation 830, the promotion may be ranked based on a number of interactions associated with the acquaintance and the promotion. At operation 840, a relevancy of the promotion may be determined for the recipient based on a rank of the promotion. At operation 850, a notification associated with the promotion may be provided to the recipient.

The operations included in process 700 and 800 are for illustration purposes. Providing a travel or a promotion based recommendation associated with a social graph may be implemented by similar processes with fewer r additional steps, as well as in different order of operations using the principles described herein. The operations described herein may be executed by one or more processors operated on one or more computing devices, one or more processor cores, specialized processing devices, and/or general purpose processors, among other examples.

In some examples, a server to provide a travel based recommendation associated with a social graph is described. The server includes a communication device, a memory configured to store instructions associated with a communication service and processor(s) coupled to memory and the communication device. The processor(s) execute the communication service in conjunction with the instructions stored in the memory. The communication service includes an inference engine and a presentation module. The inference engine is configured to process a content of a communication to identify a first travel plan associated with a recipient, where the first travel plan, includes a component associated with a previous purchase of a relation of the recipient from a social graph of the recipient, identify a second travel plan of an acquaintance of the recipient, where the acquaintance is detected from the social graph of the recipient, and detect a shared attribute between the first travel plan and the second travel plan, where the shared attribute is assigned a relevancy score. The presentation module is configured to provide, through the communication device, the shared attribute to be displayed to the recipient based on the relevancy score.

In other examples, the inference engine, is further configured to retrieve the social, graph from one or more of a social networking source and a professional networking source associated with the recipient and rank the social graph based on a number of interactions between the recipient and a social contact, where the social contact with a high number of interactions is ranked at a top of the social graph and the social contact with a low number of interaction is ranked at a bottom of the social graph. The inference engine is further configured to select the acquaintance from atop of the social graph and process a second content of another communication of the acquaintance to identify the second travel plan. The shared attribute includes one or more of a shared destination, a shared travel segment, and a shared travel time frame.

In further examples, the inference engine is further configured to analyze the shared attribute to identify a shared activity between the recipient and the acquaintance and provide the shared activity through the presentation module as a suggestion to be displayed to the recipient. The inference engine is further configured to identify a first price paid by the recipient and a second price paid by the acquaintance for the shared attribute, detect a difference between the first price paid by the recipient and the second price paid by the acquaintance, and provide the first price paid by the recipient, the second price paid by the acquaintance, and the difference through the presentation module to be displayed to the recipient. The inference engine is further configured to identify a first payment information associated with the first price from the first travel plan, where the first payment information includes one or more of a booking source, a booking time, a booking discount, and a payment type, identify a second payment information associated with the second price from the second travel plan, where the second payment information includes one or more of another booking source, another booking time, another booking discount, and another payment type, and provide the first payment information and the second payment information through the presentation module to be displayed to the recipient.

In other examples, the inference engine is further configured to identify a booking source of the second travel plan, where the booking source is different from another booking source of the first travel plan and provide the booking source through the presentation module to be displayed to the recipient. The inference engine is further configured to query the booking source of the second travel plan for information associated with the first travel plan, where the information includes one or more of a price and a related activity, receive the information associated with the first travel plan, and provide the information associated with the first travel plan through the presentation module to be displayed to the recipient. The inference engine is further configured to detect a cancellation associated with the second travel plan and provide the cancellation to be displayed to the recipient through the presentation module.

In some examples, a method executed on a computing device to provide a promotion based recommendation associated with a social graph is described. The method includes processing a content of a communication to identify a promotion directed to a recipient, querying a social networking source to identify the promotion as presented to an acquaintance of the recipient, where the acquaintance is detected from the social graph of the recipient, ranking the promotion based on a number of interactions associated with the acquaintance and the promotion, determining a relevancy of the promotion for the recipient based on a rank of the promotion, and providing a notification associated with the promotion to the recipient.

In other examples, the method further includes detecting the rank of the promotion exceed a threshold number of the interactions and classifying the promotion as a relevant communication for the recipient. The method further includes analyzing the content and a metadata of the communication to identify an item associated with the promotion and detecting an interest of the recipient associated with the item based on a purchase history associated with the item. The method further includes identifying the purchase history associated with the item by analyzing a past communication that includes one or more of an order confirmation and a shipping confirmation associated with the item. The method further includes querying the social networking source to identify a changing value of a trend associated with the promotion based on the interactions with the acquaintance and other interactions between members of the social networking source and the promotion. The method further includes increasing the rank of the promotion in proportion to an increasing value of the trend. The method further includes decreasing the rank of the promotion in proportion to a decreasing value of the trend.

In some examples, a computer-readable memory device with instructions stored thereon to provide a promotion based recommendation based on a social graph is described. The instructions include actions that are similar to the actions of the method.

In other examples, the instructions further include identifying a purchase history associated with the item by analyzing a past communication that includes one or more of an order confirmation and a shipping confirmation associated with the item and detecting an interest of the recipient associated with the item based on the purchase history associated with the item. The instructions further include transmitting the notification, for a presentation, to a communication client application actively engaged by the recipient.

In some examples, a means for providing a travel based recommendation associated with a social graph is described. The means for providing a travel based recommendation associated with a social graph includes a means for processing a content of a communication to identify a first travel plan associated with a recipient, where the first travel plan includes a component associated with a previous purchase of a relation of the recipient from a social graph of the recipient, a means for identifying a second travel plan of an acquaintance of the recipient, where the acquaintance is detected from the social graph of the recipient, a means for detecting a shared attribute between the first travel plan and the second travel plan, where the shared attribute is assigned a relevancy score, and a means for providing the shared, attribute to be displayed to the recipient based on the relevancy score.

In some examples, a means for providing a promotion based recommendation associated with a social graph is described. The means for providing a promotion based recommendation associated with a social graph includes a means for processing a content of a communication to identify a promotion directed to a recipient, a means for querying a social networking source to identify the promotion as presented to an acquaintance of the recipient, where the acquaintance is detected from the social graph of the recipient, a means for ranking the promotion based on a number of interactions associated with the acquaintance and the promotion, a means for determining a relevancy of the promotion for the recipient based on a rank of the promotion and a means for providing a notification associated with the promotion to the recipient.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A server to provide a travel based recommendation associated with a social graph, the server comprising:
    a communication device configured to communicate with one or more client devices over a network;
    a memory configured to store instructions;
    one or more processors coupled to the memory and the communication device, the one or more processors configured to execute the instructions stored in the memory to provide an inference engine,
    the inference engine configured to:
        access a previously-received electronic message managed by a communication service, wherein the previously received electronic message was sent to a recipient;
        analyze a content of the previously-received electronic message to identify a first travel plan associated with the recipient of the previously-received electronic message, wherein the content of the previously-received electronic message confirms a previous purchase of the first travel plan by the recipient;
        in response to identifying the first travel plan through processing of the content of the previously-received electronic message, query an external network to identify a second travel plan of an acquaintance of the recipient, wherein the acquaintance is detected from a social graph of the recipient;
        detect a shared attribute between the first travel plan and the second travel plan, wherein the shared attribute is assigned a relevancy score; and
        provide, through the communication device, the shared attribute to be displayed to the recipient based on the relevancy score through a client application executed on a client device.

2. The server of claim 1, wherein the inference engine is configured to:
    retrieve the social graph from one or more of a social networking source and a professional networking source associated with the recipient; and
    rank the social graph based on a number of interactions between the recipient and a social contact, wherein the social contact with a high number of interactions is ranked at a top of the social graph and the social contact with a low number of interaction is ranked at a bottom of the social graph.

3. The server of claim 2, wherein the inference engine is configured to:
  select the acquaintance from a top of the social graph; and
  process a second content of another electronic message of the acquaintance to identify the second travel plan.

4. The server of claim 1, wherein the shared attribute includes one, or more of a shared destination, a shared travel segment, and a shared travel time frame.

5. The server of claim 1, wherein the inference engine is configured to:
  analyze the shared attribute to identify a shared activity between the recipient and the acquaintance; and
  provide the shared activity as a suggestion to be displayed to the recipient.

6. The server of claim 1, wherein the inference engine is processors are further configured to:
  identify a first price paid by the recipient and a second price paid by the acquaintance for the shared attribute;
  detect a difference between the first price paid by the recipient and the second price paid by the acquaintance; and
  provide the first price paid by the recipient, the second price paid by the acquaintance, and the difference to be displayed to the recipient.

7. The server of claim 6, wherein the inference engine is configured to:
  identify a first payment information associated with the first price from the first travel plan, wherein the first payment information includes one or more of a booking source, a booking time, a booking discount, and a payment type;
  identify a second payment information associated with the second price from the second travel plan, wherein the second payment information includes one or more of another booking source, another hooking time, another booking discount, and another payment type; and
  provide the first payment information and the second payment information to be displayed to the recipient.

8. The server of claim 1, wherein the inference engine is configured to:
  identify a booking source of the second travel plan, wherein the booking source is different from another booking source of the first travel plan; and
  provide the booking source to be displayed to the recipient.

9. The server of claim 8, wherein the inference engine is configured to:
  query the booking source of the second travel plan for information associated with the first travel plan, wherein the information includes one or more of a price and a related activity; receive the information associated with the first travel plan; and
  provide the information associated with the first travel plan to be displayed to the recipient.

10. The server of claim 1, wherein the inference engine is configured to:
  detect a cancellation associated with the second travel plan; and
  provide the cancellation to be displayed to the recipient.

11. A method executed on a computing device to provide a promotion based recommendation associated with a social graph, the computing device including a communication device configured to communicate with one or more client devices over a network, a memory configured to store instructions, and one or more processors coupled to the memory and the communication device, the one or more processors configured to execute instructions stored in the memory to provide an inference engine, the method comprising:
  accessing, by the inference engine, a previously-received electronic message managed by a communication service, wherein the previously-received message was sent to a recipient;
  analyzing, by the inference engine, a content of the previously-received electronic message to identify a promotion directed to the recipient of the electronic message, the previously-received electronic message including one selected from a group consisting of an email, a text message, and a social networking post;
  querying, by the inference engine, a social networking source to identify the promotion as presented to an acquaintance of the recipient, wherein the acquaintance is detected from the social graph of the recipient;
  ranking, by the inference engine, the promotion based on a number of interactions associated with the acquaintance and the promotion;
  determining, by the inference engine, a relevancy of the promotion for the recipient based on a rank of the promotion; and
  providing, by the communication device, a notification associated with the promotion to the recipient through a client application executed on a client device.

12. The method of claim 11, further comprising:
  detecting the rank of the promotion exceed a threshold number of the interactions; and
  classifying the promotion as a relevant electronic message for the recipient.

13. The method of claim 11, further comprising:
  analyzing the content and a metadata of the previously-received electronic message to identify an item associated with the promotion; and
  detecting an interest of the recipient associated with the item based on a purchase history associated with the item.

14. The method of claim 13, further comprising:
  identifying the purchase history associated with the item by analyzing a previously-received electronic message that includes one or more of an order confirmation and a shipping confirmation associated with the item.

15. The method of claim 11, further comprising:
  querying the social networking source to identify a changing value of a trend associated with the promotion based on the interactions with the acquaintance and other interactions between members of the social networking source and the promotion.

16. The method of claim 15, further comprising:
  increasing the rank of the promotion in proportion to an increasing value of the trend.

17. The method of claim 15, further comprising:
  decreasing the rank of the promotion in proportion to a decreasing value of the trend.

18. A computing device to provide a travel based recommendation associated with a social graph, the computing device comprising:
  a communication device configured to communicate with one or more client devices over a network;
  a memory configured to store instructions;
  one or more processors coupled to the memory and the communication device, the one or more processors configured to the instructions stored in the memory to provide an inference engine, the inference engine configured to:

access a previously-received electronic message managed by a communication service, wherein the previously received electronic message was sent to a recipient;

analyze a content and a metadata of a previously-received electronic message sent to a recipient to identify a promotion directed to the recipient of the previously-received electronic message, wherein the promotion includes an item of interest to the recipient and the previously-received electronic message includes one selected from a group consisting of an email, a text message, and a social networking post;

query a social networking source to identify the promotion as presented to an acquaintance of the recipient, wherein the acquaintance is detected from a social graph of the recipient;

rank the promotion based on a number of interactions associated with the acquaintance and the promotion;

determine a relevancy of the promotion for the recipient based on a rank of the promotion; and provide, through the communication device, a notification associated with the promotion to the recipient through a client application executed on a client device.

19. The computing device of claim 18, wherein the inference engine is further configured to:

identify a purchase history associated with the item by analyzing a previously-received electronic message that includes one or more of an order confirmation and a shipping confirmation associated with the item; and detect an interest of the recipient associated with the item based on the purchase history associated with the item.

\* \* \* \* \*